July 22, 1947.  F. L. MELVILL  2,424,248
CONTACTING APPARATUS
Filed March 29, 1944  2 Sheets-Sheet 1
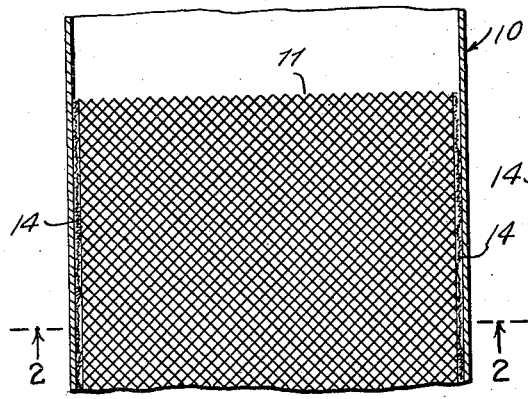
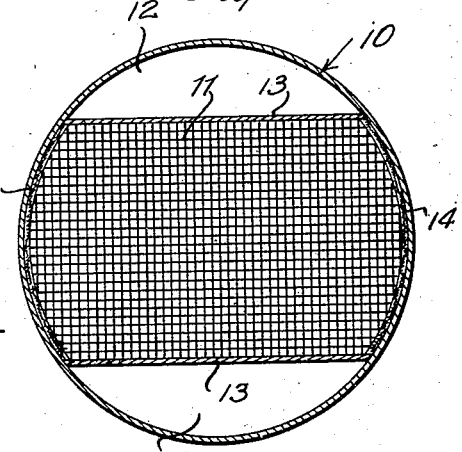
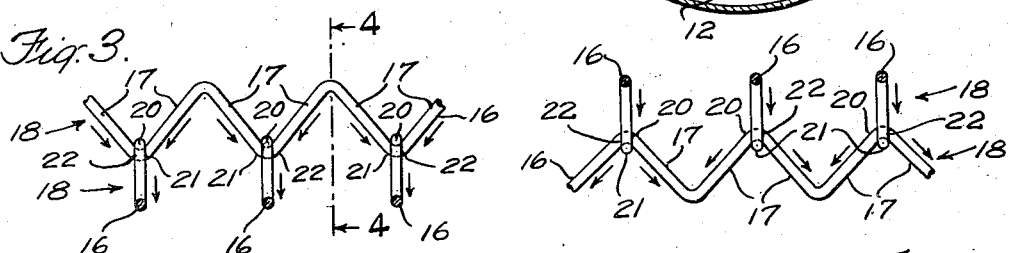
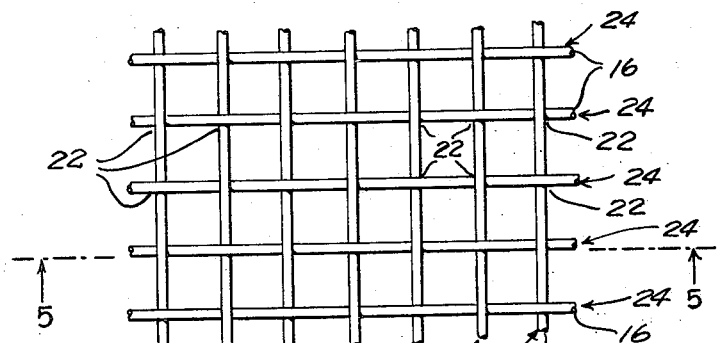
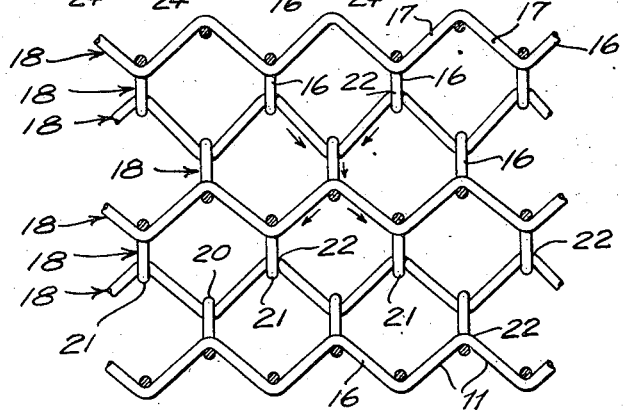
INVENTOR
FRANCIS L. MELVILL
BY Lee Allan Swem
ATTORNEY July 22, 1947.  F. L. MELVILL  2,424,248
CONTACTING APPARATUS
Filed March 29, 1944   2 Sheets-Sheet 2
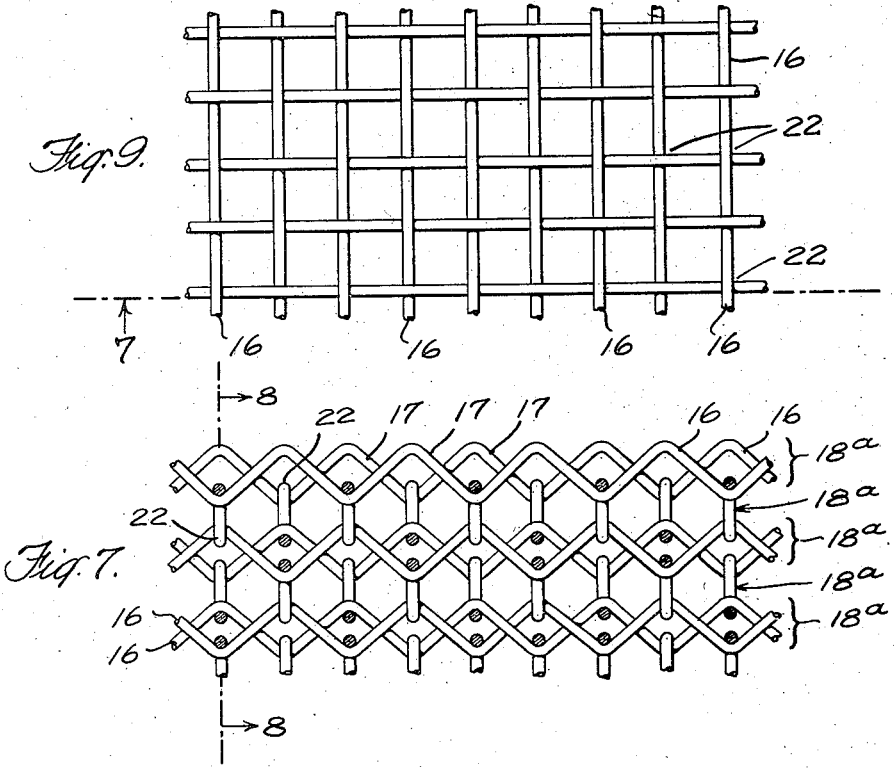
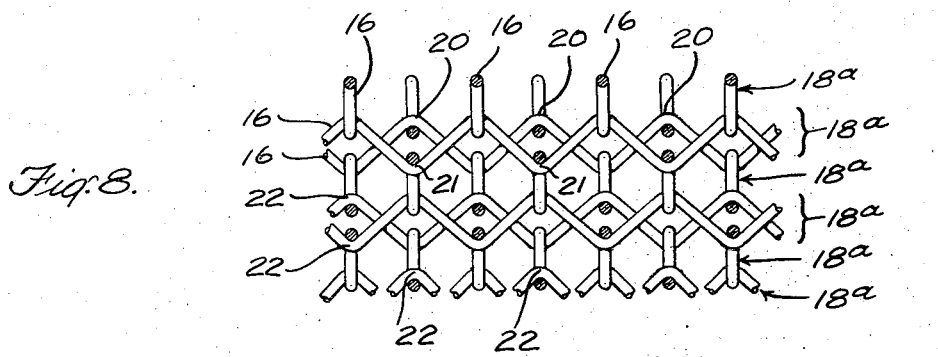
INVENTOR
FRANCIS L. MELVILL
BY Lee Allan Swem
ATTORNEY Patented July 22, 1947

2,424,248

UNITED STATES PATENT OFFICE 2,424,248

CONTACTING APPARATUS

Francis L. Melvill, New York, N. Y.

Application March 29, 1944, Serial No. 528,541

8 Claims. (Cl. 261—95)

This invention relates to apparatus for the contacting of gases or vapors and liquids. Although the invention has a wide range of utility, it is particularly useful in connection with contacting methods and apparatus such as are employed for the absorption, cooling, drying, cleansing or humidifying of gases, for the evaporation, cooling or heating of liquids, or for reaction purposes. Such apparatus may, for example, take the form of fractionating towers, scrubbers, cooling towers and the like. In such apparatus, a packing is usually employed for effecting intimate contact between the descending liquid and the ascending gas or vapor. As used herein and in the claims, the term "gas" includes vapor within its scope.

The invention provides a new and improved countercurrent gas and liquid contact apparatus by means of which the flow of liquid downwardly through a treating chamber is effected in regular predetermined symmetrical manner to assure uniform distribution of the liquid throughout the liquid flow area of the chamber.

The invention provides a novel packing for gas and liquid contacting apparatus which avoids the presence of unequal gas or liquid passages and prevents channeling or segregation of the flowing gas in open spaces and of the liquid along surface areas, with the result that at any cross-section of the packing at right angles to the general direction of countercurrent flow of the liquid and gas, the composition of the liquid and gas is substantially uniform.

The invention also provides a new and improved packing of the general character described, which feeds and spreads out the liquid evenly in a thin film and in a regular predetermined symmetrical manner as it descends in a treating chamber, so that even distribution of the liquid throughout the flow area of the chamber is afforded, which provides the maximum of effective (i. e., wetted) surface area per unit of packing space, offers a minimum of resistance to the passage of the ascending gas, and affords a maximum of intimacy of contact and interaction between liquid and gas, so that equilibrium between the fluid in either phase immediately adjacent to the inter-face and the main bulk of the fluid comprising the phase is rapidly attained.

The invention further provides a packing of the general character described, which comprises a series of simple, comparatively inexpensive elements requiring little or no shaping, and which can be easily and expeditiously assembled.

In the operation of the apparatus of the invention, liquid is subdivided into a predetermined number of thin exposed streams which are directed downwardly along substantially uniform zig-zag courses having alternate angles in vertical planes at right angles to each other. These downward zig-zag stream courses are relatively disposed to merge with the apices of adjoining stream courses at regularly disposed, equally spaced zones, whereby groups of adjoining streams merge and are intermixed at these zones, and are then subdivided into a corresponding number of thin streams for subsequent mergence with other streams. Due to the alternate course of each zig-zag stream between planes at right angles to each other, the liquid is uniformly distributed throughout the flow area of the packing.

Packing embodying the invention, comprises slender packing elements in the form of rods, wires, tubes, flat strips or the like, which are uniformly zig-zagged and made to extend generally horizontally. The packing elements of one set extend in parallel vertical planes, and the packing elements of the other set extend in parallel vertical planes at right angles to the first mentioned planes, the two sets of elements being reversely interlinked at their apices to form liquid mixing zones at the coupled sections of the elements. Converging downwardly at equal inclinations towards each mixing zone, are two upper adjoining oblique sections of an element of one set, and diverging downwardly from the zone at equal inclinations, are two lower adjoining oblique sections of the element of another set. The two liquid streams flowing downwardly in one vertical plane along the two upper converging element sections merge and are thoroughly mixed at the interlinked mixing zone, and the resulting mixture is equally subdivided into two equal streams and made to flow along the two lower diverging element sections in a vertical plane at right angles to the first mentioned plane. This operation of mixing, subdividing and redistributing the liquid streams is repeated regularly in accordance with a predetermined pattern to assure uniformity in the composition of the liquid and gas throughout the flow area of the packing at any horizontal section thereof.

The invention will be understood from the following description when considered in connection with the accompanying drawings forming a part thereof, and in which:

Fig. 1 is a fragmentary axial vertical section, somewhat diagrammatic, of a gas and liquid contacting device containing a packing embodying the invention;

Fig. 2 is a transverse section, somewhat diagrammatic, of a contacting device taken along the line 2—2 of Fig. 1;

Fig. 3 is a front vertical section of a portion of a packing, showing two superposed horizontal rows of zig-zag packing elements interlinked in accordance with an embodiment of the invention;

Fig. 4 is a side vertical section of the portion of the packing taken on line 4—4 of Fig. 3;

Fig. 5 is a fragmentary front vertical section of a packing taken on line 5—5 of Fig. 6, the constituent elements being similar to those indicated in Figs. 3 and 4, and being shown assembled in accordance with one embodiment of the invention;

Fig. 6 is a top plan view of the packing shown in Fig. 5;

Fig. 7 is a fragmentary front vertical section of a packing taken on line 7—7 of Fig. 9, the constituent elements being similar to those indicated in Figs. 3 and 4, but being shown assembled in an alternative way in accordance with another embodiment of the invention;

Fig. 8 is a vertical section of the packing taken on line 8—8 of Fig. 7; and

Fig. 9 is a top plan view of the packing shown in Fig. 7.

Like characters of reference refer to the same or to similar parts throughout the several views.

Referring to Figs. 1 and 2 of the drawings, the gas and liquid contacting device as shown, comprises a vertical cylindrical column or tower 10 containing the packing 11 of the invention. The gas to be contacted is delivered to the lower portion of the tower 10 below the packing 11, and flows upwardly through the packing, while the liquid is fed to the upper portion of the tower above the packing, and flows downwardly through the packing and in intimate contact with the ascending gas in a manner to be described. The liquid preferably is delivered to the upper portion of the tower 10 and over the packing 11 in such scattered form as to be spread substantially evenly over the top of the packing 11, so that the liquid is distributed substantially uniformly throughout the packing at its upper end. For that purpose, the liquid may be delivered over the packing 11 in spray form, or may be delivered by a liquid feed device similar to that shown and described in my copending application Serial No. 536,306, filed May 19, 1944, to feed the liquid in predetermined equally spaced fine streams over the packing.

The packing 11 is shown occupying the central portion of the tower 10, while the diametrically opposite side chordal sections 12 of the tower are left vacant or unpacked. A pair of partition plates 13 on the chordal sides respectively of the packing 11, prevent flow into or out of the packing through these sides. The unpacked spaces 12 of the tower 10 may be sealed either at the bottom or at the top in any manner well-known in the art, to prevent by-pass flow through these spaces. The clearance between the circular peripheral portions of the packing 11 and the corresponding wall of the tower 10 may be sealed by any suitable means, as for example by means of layers 14 of glass wool.

The packing 11 comprises a series of slender elements 16 which may be in the form of wires, tubes, flat strips or the like, and which are shown specifically as solid cylindrical rods. These packing elements 16 are identical in cross-sectional size, shape and finish, and their surfaces are of such material and finish as to be substantially wetted by the liquid under normal operating conditions. For that purpose, the packing elements 16 are desirably of a material, such as metal or plastic for example, having the necessary finish to afford the required wetting properties.

Although the packing elements 16 are shown of cylindrical stock, as far as certain aspects of the invention are concerned, these may be of any suitable cross-sectional shape providing it is symmetrical about a vertical plane parallel to the axis of the element. The surface of the elements may be grooved, fluted or otherwise treated to form a regular pattern thereon. These surface grooves may extend parallel to the longitudinal axes of the elements 16, or may extend helically in the form of a thread. Such surface grooving of the elements 16 may be provided to increase the liquid carrying capacity of the elements.

Also, instead of using single rods, wires or the like, as far as certain aspects of the invention are concerned, each of the packing elements 16 may consist of multiple wires, braided or helically twisted together or laid side by side.

Each of the packing elements 16 is regularly zig-zagged to form a plurality of successive oblique turns or sections 17 of equal length. These elements 16 are arranged in general horizontal directions and in vertical planes, so that adjoining sections 17 of an element extend obliquely at the same inclinations with the vertical.

The elements 16 are laid in horizontal rows or tiers 18 as shown in Figs. 3 and 4, with the elements in one tier disposed in parallel vertical planes, and the elements in the next successive tier disposed in parallel vertical planes at right angles to the first mentioned planes. The elements 16 of a lower tier 18 are suspended from the elements of an upper successive tier by looping the peak apices 20 of the lower elements over the respective trough apices 21 of the upper elements, so that the elements of the two tiers are interlinked to form a series of double forks. The sections 22 of the double forks, where superposed elements 16 are apically coupled together, form liquid mixing junction zones. Since all the elements 16 are substantially identical, except perhaps in overall length, any two adjoining oblique sections 17 of an upper element will converge downwardly towards a liquid mixing zone 22 at equal inclinations with respect to the vertical, and the two adjoining oblique sections 17 of the next lower element 16 will diverge downwardly from the mixing zone at inclinations equal to those of the upper sections 17.

The liquid flows obliquely downwardly along the adjoining converging sections 17 of an upper element, and towards the corresponding junction zone 22 of the element sections in substantially equal streams. These liquid streams are merged and thoroughly mixed at this junction zone 22. The resulting liquid mixture is then subdivided equally between the two lower oblique element sections 17 diverging downwardly from the junction zone 22. The two upper liquid streams converging downwardly towards a junction zone 22 are in one vertical plane, and the two lower liquid streams diverging downwardly from this zone are in a vertical plane at right angles to the first mentioned plane. Alternate distribution of the liquid in planes at right angles to each other is thereby attained.

In Figs. 4 and 5 is shown the manner in which the elements 16 of Figs. 3 and 4 may be arranged and laid to form a composite packing. In this form of assembly, the elements 16 are horizontally arranged in tiers or rows 18 with all of the elements of each tier disposed in horizontal registry. The distances between the elements 16 of each tier 18 are equal and conform with the distances between the elements of the other tiers, so that the elements in the composite packing will be arranged in vertical layers 24. The composite packing will comprise two series of these vertical parallel layers 24 at right angles to each other, the elements 16 of the two series being criss-crossed and interlaced, and the elements of the different horizontal tiers 18 being progressively suspended one tier from the other, so that they will hang together.

The interstitial openings of the packing are large enough to prevent capillary filming of the downwardly flowing liquid across the openings, but are as small as possible having regard for the liquid-gas load. The diameter of the elements and the extent of zig-zag offset depends on the character of the liquid being treated. In a specific application, the elements 16 may be about one-tenth of an inch in diameter, and may be offset by the zig-zags to an extent equal to about twice their diameter.

To prevent the liquid from dripping from the lowermost apex point of the trough section of an element 16 at a junction zone 22, the oblique element sections 17 diverging downwardly from the zone extend at a sufficiently acute angle with the horizontal, so that the latter section tends to drain the liquid from the junction zone 22 rather than allow the liquid to fall in the form of droplets from the lowermost apex point. In any case, in order to assure against dripping of the liquid from a junction zone 22, it is advisable that the lowermost apex point of the trough section of an element at that zone does not extend below the meniscus of the liquid formed in the peak corner of the element sections 17 diverging downwardly from the junction zone.

Although the operation of the packing of Figs. 3 to 6 has been made apparent, it is briefly summarized at this point. In the use of this packing, the liquid with which it is desired to contact the ascending gases, is delivered to the top section of the packing as described, and is divided into a number of predetermined exposed filmiform streams which flow obliquely downwardly along the elements 16 on regular zig-zag courses in directions generally counter to the direction of the flow of the gas. The maximum of liquid surface is thereby exposed to the action of the ascending gases.

The liquid stream flowing downwardly along a single oblique section 17 of an upper element 16 in one vertical layer 24, merges at a liquid mixing junction zone 22 with the liquid stream flowing down an adjoining oblique section of the element. At this junction zone 22, the two streams are thoroughly intermixed, and the resulting mixture is then subdivided and redistributed equally between the adjoining diverging sections 17 of a lower element 16 disposed in another vertical layer 24 at right angles to the vertical layer of the upper element. This operation is repeated, the liquid streams converging in one plane towards junction, and then being subdivided for redistribution in another plane transverse thereto, so that alternate distribution of the liquid in planes at right angles to each other is affected. The liquid is therefore uniformly mixed and redistributed throughout the entire flow area of the packing.

If the flow along the different oblique element sections 17 is not equal, the degree of irregularity will tend to become progressively reduced, due to the fact that each section will divide the whole of the liquid reaching a mixing zone 22 equally with its element partner in that zone. This is particularly important in the upper section of the packing where the liquid feed may not be deposited uniformly over the top of the packing. By the equalizing process described, the distribution of the liquid under these conditions will become uniform in the upper section of the packing. Uniform distribution of the liquid when once attained near the top of the packing, will persist to the bottom of the packing.

The gas passing upwardly generally countercurrent to the liquid is subjected to sufficient turbulence to cause thorough mixing, thus avoiding the loss of efficiency which results when the gas at the liquid-gas interface is not mixed as rapidly as possible with the main bulk of the gas, and when other purely local conditions within the packing tend to vary the composition of the gas across any section of the tower. The velocity of flow of gas upwardly through the packing, will be substantially the same at any point in any plane at right angles to the general direction of flow. Maximum intimacy of contact and maximum interaction between liquid and gas is obtained, and equilibrium is rapidly established between the material in either liquid or vapor phase immediately adjacent to the interface and the main bulk of the material comprising the phase. On any cross-section of the packing at right angles to the general direction of flow of the liquid and the gas, the composition of the gas is substantially the same, and the composition of the liquid in its constituent streams is substantially the same. A comparatively long path of travel of the liquid passing through the packing is provided, so that retention of the liquid for a period long enough to assure the necessary saturation or interaction with the gas is assured.

In the form of packing shown in Figs. 7, 8 and 9, the individual elements 16 are constructed and arranged as shown in Figs. 3 and 4, with zig-zag elements of a lower horizontal tier 18a suspended from the zig-zag elements of an upper horizontal tier through the apical suspensory interengagement of these elements. However, instead of having all the elements 16 in a tier 18a in horizontal registry, alternate elements of each tier are in horizontal registry but are staggered medially with respect to the intervening elements of the tier, so that the peak apex 20 of one element in a tier is in the vertical plane of the trough apices 21 of the adjacent elements in the latter tier. The effect of this arrangement is to reduce the size of the gas passages between the elements 16 and increase the packing surface per unit of volume compared with the construction of Figs. 5 and 6, while retaining the advantages of alternately distributing the liquid in directions at right angles to each other. This effect can be further increased by increasing the number of elements 16 per horizontal tier, and having, for example, every third or fourth element in the tier in horizontal registry, while the intervening elements are equally spaced out of registry with respect to the registered elements.

The packing herein described is applicable to liquid and gas contacting devices, such as bubble towers, scrubbers, cooling towers, fractionating towers and the like, but it is not intended that the packing should be limited to equipment of this type. It is also contemplated that the packing itself may be used as a catalyst. Under these conditions, the packing itself may, for example, be made of nickel, copper or any of the solid materials having the required catalytic properties. For that purpose, the catalytic packing may serve to increase the rate of reaction by contact with a gas, or by contact with a liquid. As another example of the use of the packing, it may serve as a catalyst carrier, the catalyst, for example, being formed into beads which are threaded on the elements defining the packing. Also, if desired, the surface of the packing elements may be subjected to special treatment to form a layer of catalytic material thereon. As another example of the use to which the packing may be put, it may serve as a carrier of a catalyst which takes the form of a liquid, and particularly a high viscous liquid such as phosphoric acid.

Inasmuch as each element has portions which extend in a downwardly inclined direction from the inner wall of the tower 10, liquid which reaches the wall by way of some of the elements will flow away from the wall by other elements, and thus will tend to retain the liquid in the packing and prevent short circuiting flow down the wall of the tower.

The velocity of the vapor flowing upwardly through the packing will cause or tend to cause the liquid on the vertically inclined portions of the elements to assume a streamlined or tear drop shape such as would present the minimum resistance to the flow of vapors and this, together with the surface effects which become pronounced with thin films of liquid, will have the effect of distributing the liquid over the surfaces of the elements with a tendency for a major part of the liquid to flow down the upper parts of the elements, the amount of liquid so flowing increasing with increased vapor velocity. The effect of this is to insure the maximum exposure of the liquid to the vapor and to facilitate the mixing of the streams of liquid at the juncture points.

Since many changes can be made in the apparatus disclosed herein, and many apparently widely different embodiments of the invention can be made without departing from the scope of the claims, it is intended that all matter contained in the above description or shown in the accompanying drawings shall be interpreted as illustrative and not in a limiting sense.

What is claimed is:

1. Vapor and liquid contacting apparatus packing comprising a network of slender, generally horizontally extending elements arranged in two sets in accordance with a predetermined pattern, the elements of each set being of zig-zag shape and having alternately arranged apices interconnected by oblique sections, the elements of one set extending in generally vertically extending planes, the elements of the other set extending in other generally vertical planes transversely of the first-mentioned vertical planes, the two sets of elements being reversely interlinked at their apices to form liquid mixing zones at said apices, the elements in each vertical plane being disposed in spaced generally horizontally extending planes.

2. Vapor and liquid contacting apparatus packing comprising a network of slender, generally horizontally extending elements arranged in two sets in accordance with a predetermined pattern, the elements of each set being of zig-zag shape and having alternately arranged apices interconnected by oblique sections, the elements of one set extending in substantially parallel vertical planes, the elements of the other set extending in substantially parallel other vertical planes extending transversely of the first-mentioned vertical planes, the two sets of elements being reversely interlinked at their apices to form liquid mixing zones at said apices, the elements in each vertical plane being disposed in spaced parallel horizontal planes, the elements in said spaced horizontal planes of each vertical plane having their apices in substantial vertical alignment and their oblique sections substantially parallel.

3. Vapor and liquid contacting apparatus packing comprising a network of slender, generally horizontally extending elements arranged in two sets in accordance with a predetermined pattern, the elements of each set being of zig-zag shape and having alternately arranged apices interconnected by oblique sections, the elements of one set extending in substantially parallel vertical planes, the elements of the other set extending in substantially parallel other vertical planes which extend at right angles to the first-mentioned vertical planes, the two sets of elements being reversely interlinked at their apices to form liquid mixing zones at said apices, the elements in each vertical plane being disposed in spaced parallel horizontal planes.

4. Vapor and liquid contacting apparatus packing comprising a network of slender, generally horizontally extending elements arranged in two sets in accordance with a predetermined pattern, the elements of each set being of zig-zag shape and having alternately arranged apices interconnected by oblique sections, the elements of one set extending in substantially parallel vertical planes, the elements of the other set extending in substantially parallel other vertical planes extending transversely of the first-mentioned vertical planes, the two sets of elements being reversely and suspensibly interlinked at their apices to form liquid mixing zones at said apices, the elements in each vertical plane being disposed in spaced parallel horizontal planes.

5. Vapor and liquid contacting apparatus packing comprising a network of slender, generally horizontally extending elements arranged in two sets in accordance with a predetermined pattern, the elements of each set being of zig-zag shape and having alternately arranged apices interconnected by oblique sections of equal length which extend at equal inclinations, the elements of one set extending in substantially parallel vertical planes, the elements of the other set extending in substantially parallel other vertical planes extending transversely of the first-mentioned vertical planes, the two sets of elements being reversely interlinked at their apices to form liquid mixing zones at said apices, the elements in each vertical plane being disposed in spaced parallel horizontal planes.

6. Vapor and liquid contacting apparatus packing comprising a network of slender, generally horizontally extending elements arranged in two sets in accordance with a predetermined pattern, the elements of each set being of zig-zag shape and having alternately arranged apices interconnected by oblique sections, the elements of one set extending in substantially parallel vertical planes, the elements of the other set extending in substantially parallel other vertical planes extending transversely of the first-mentioned vertical planes, the two sets of elements being reversely interlinked at their apices to form liquid mixing zones at said apices, the elements in each vertical plane being disposed in spaced parallel horizontal planes, the apices and oblique sections of the elements in adjacent parallel vertical planes and the apices and oblique sections of the elements in adjacent other parallel vertical planes respectively being in horizontal register.

7. Vapor and liquid contacting apparatus packing comprising a network of slender, generally horizontally extending elements arranged in two sets in accordance with a predetermined pattern, the elements of each set being of zig-zag shape and having alternately arranged apices interconnected by oblique sections, the elements of one set extending in substantially parallel vertical planes, the elements of the other set extending in substantially parallel other vertical planes extending transversely of the first-mentioned vertical planes, the two sets of elements being reversely interlinked at their apices to form liquid mixing zones at said apices, the elements in each vertical plane being disposed in spaced parallel horizontal planes, the apices and oblique sections of the elements in adjacent parallel vertical planes and the apices and oblique sections of the elements in adjacent other parallel vertical planes respectively being out of horizontal register.

8. Vapor and liquid contacting apparatus packing comprising a network of slender, generally horizontally extending elements arranged in two sets in accordance with a predetermined pattern, the elements of each set being of zig-zag shape and having alternately arranged apices interconnected by oblique sections, the elements of one set extending in substantially parallel vertical planes, the elements of the other set extending in substantially parallel other vertical planes extending transversely of the first-mentioned vertical planes, the two sets of elements being reversely interlinked at their apices to form liquid mixing zones at said apices, the elements in each vertical plane being disposed in spaced parallel horizontal planes, the apices and oblique sections of the elements in adjacent parallel vertical planes and the apices and oblique sections of the elements in adjacent other parallel vertical planes respectively being out of horizontal register, the said apices and oblique sections of the elements in alternate parallel vertical planes and the apices and oblique sections of the elements in alternate other parallel vertical planes respectively being in horizontal register.

FRANCIS L. MELVILL.

REFERENCES CITED

The following references are of record in the file of this patent:

UNITED STATES PATENTS

| Number | Name | Date |
|---|---|---|
| 405,064 | Wood | June 11, 1889 |
| 522,549 | Barnard | July 3, 1894 |
| 459,254 | McAuley | Sept. 8, 1891 |
| 970,520 | Lombard | Sept. 20, 1910 |

FOREIGN PATENTS

| Number | Country | Date |
|---|---|---|
| 427,087 | Great Britain | Apr. 16, 1935 |
| 28,149 | Norway | Dec. 6, 1916 |
| 576,026 | Germany | May 5, 1933 |
| 147,213 | Great Britain | Apr. 7, 1921 |
| 321,768 | Germany | June 14, 1920 |